UNITED STATES PATENT OFFICE.

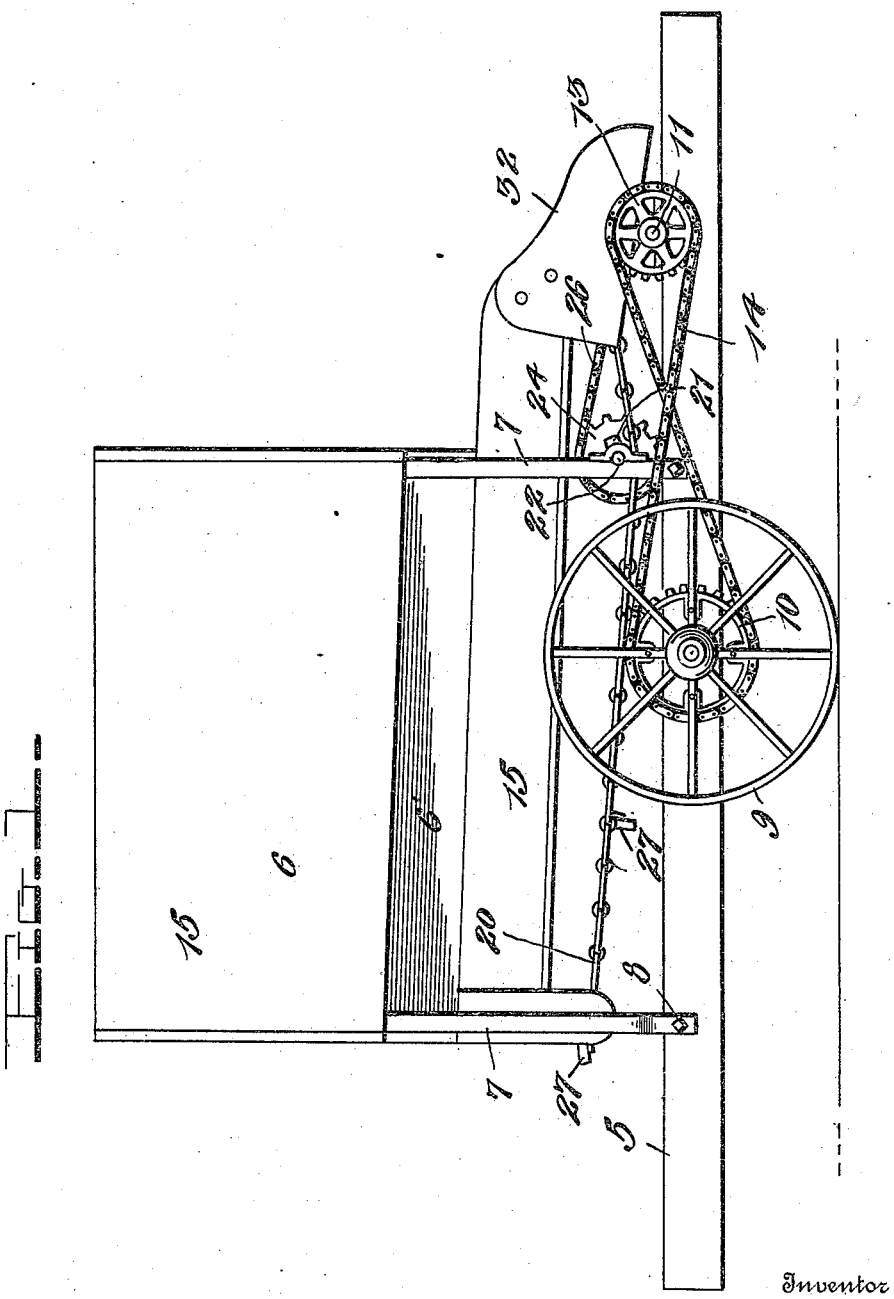

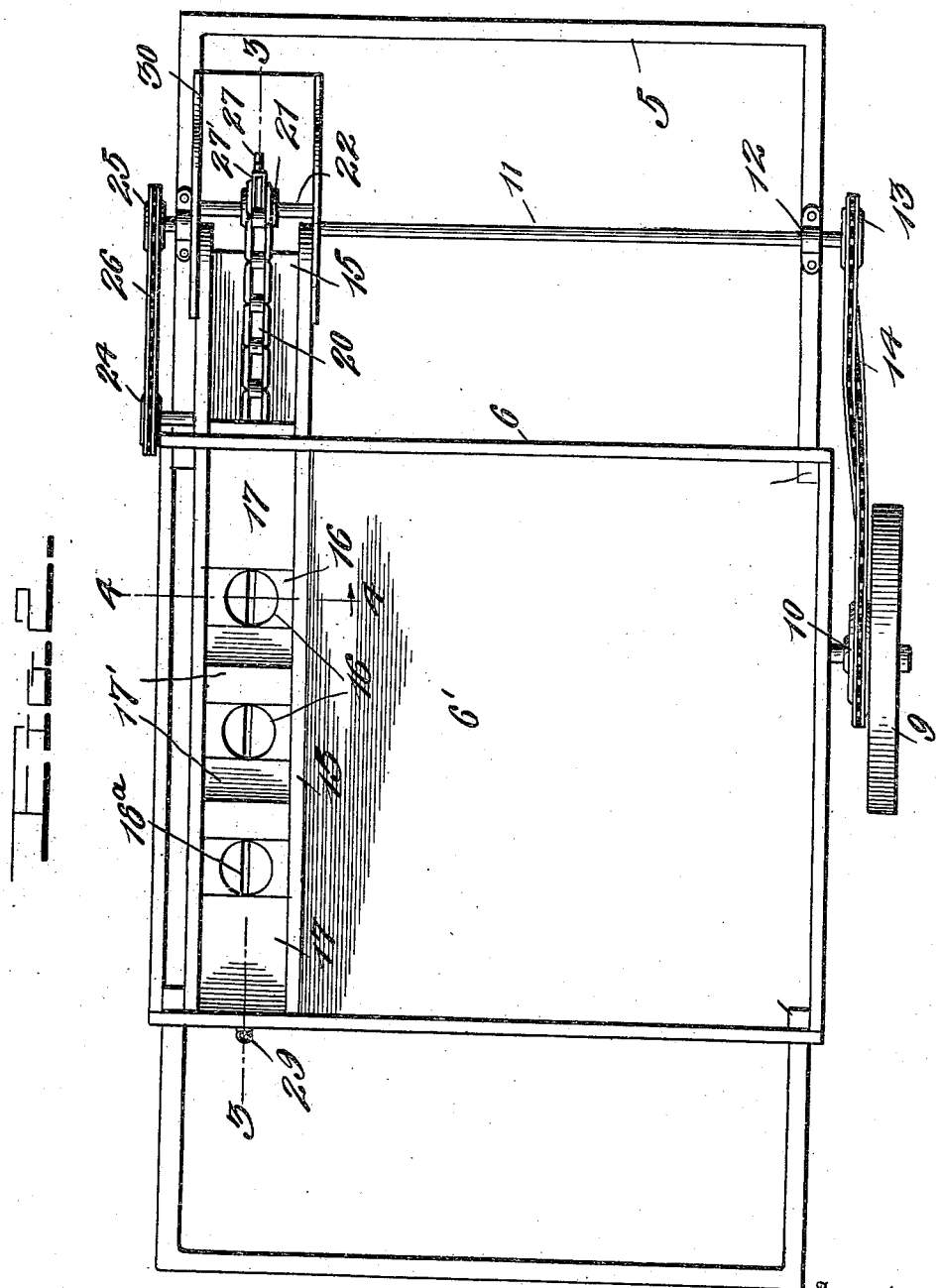

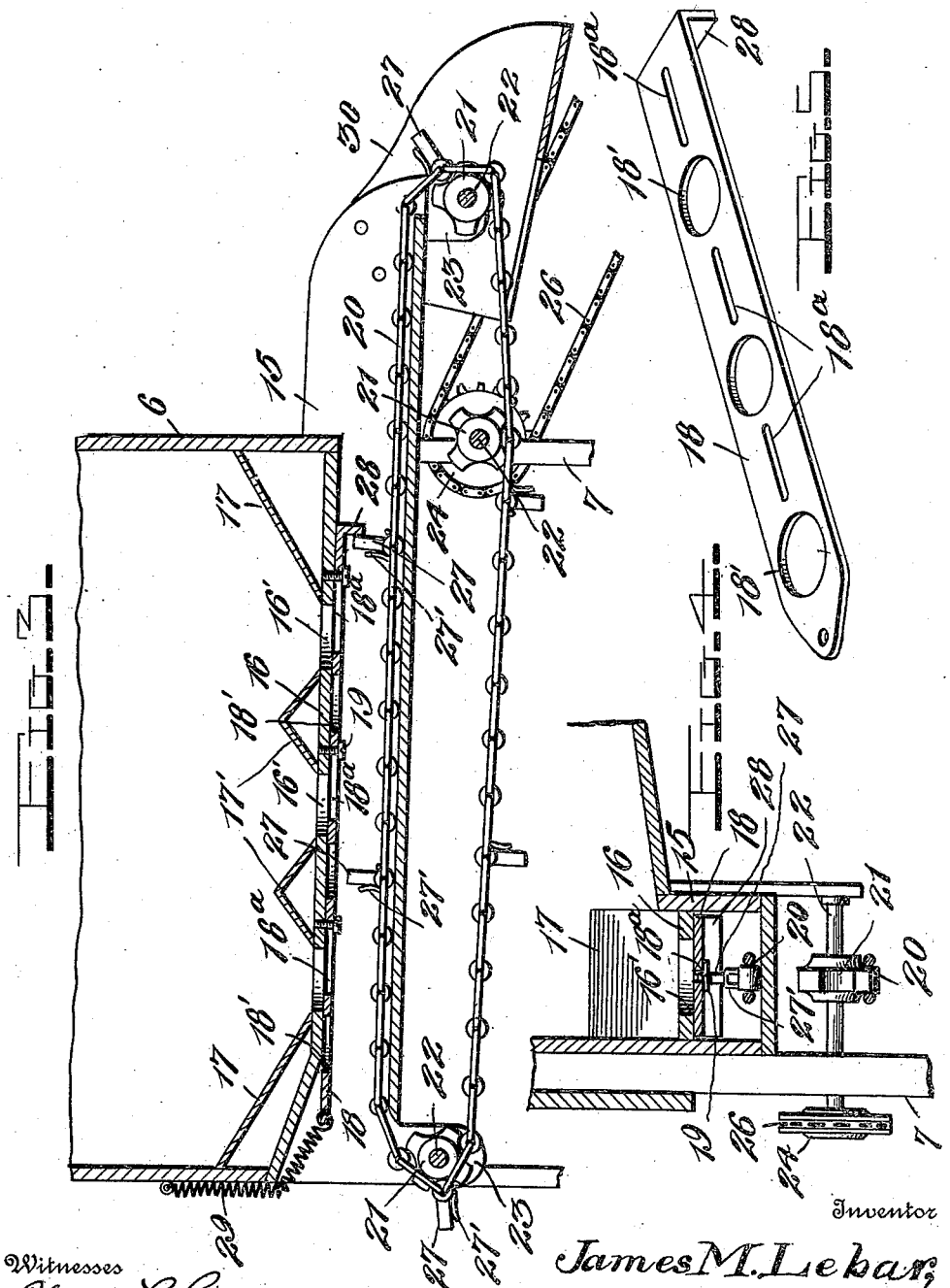

JAMES MATHEW LEBAR, OF LANGDON, NORTH DAKOTA.

PLANTING-MACHINE.

991,071.  Specification of Letters Patent.  Patented May 2, 1911.

Application filed January 27, 1911. Serial No. 605,011.

*To all whom it may concern:*

Be it known that I, JAMES MATHEW LE-BAR, a citizen of the United States, residing at Langdon, in the county of Cavalier and State of North Dakota, have invented certain new and useful Improvements in Planting-Machines, of which the following is a specification, reference being had to the accompanying drawings.

This invention relates to automatic planters, and more particularly to a potato planting machine, and the invention has for its principal object to provide a comparatively simple and efficient mechanism whereby seed potato may be automatically and intermittently dropped into the furrow as the machine moves over the ground.

A further object of the invention resides in the provision of a hopper mounted upon a suitable frame, and having a plurality of openings in its bottom, suitable directing means being arranged in the hopper to direct the potato into said openings, a valve plate arranged beneath the hopper having openings therein, and means actuated in the movement of the machine to intermittently engage and move the valve plate and aline the openings thereof with the openings of the hopper.

With the above and other objects in view the invention consists of the novel features of construction and the combination and arrangement of parts hereinafter fully described and claimed and illustrated in the accompaying drawings in which—

Figure 1 is a side elevation of a potato planting machine constructed in accordance with the present invention. Fig. 2 is a top plan view thereof. Fig. 3 is a longitudinal section taken on line 3—3 of Fig. 2. Fig. 4 is a detail transverse section taken on the line 4—4 of Fig. 2, and Fig. 5 is a detail perspective view of the sliding valve plate.

Referring more particularly to the drawings, 5 indicates the frame of the machine. This frame may be of any desired form and has mounted thereon the seed box or hopper 6. The hopper 6 is preferably rectangular in form and at each of its corners is provided with a depending supporting leg 7. The lower ends of these legs are bifurcated to receive the side bars of the frame 5, and carry set screws 8 which are adapted to coact with said side bars, and rigidly secure the hopper in position. The frame 5 is supported by the usual ground wheels 9, and upon the shaft of one of these ground wheels, the band wheel 10 is fixed. A transverse shaft 11 is mounted in bearing 12 on the rear end of the machine frame, and has a sprocket wheel 13 fixed on one end thereof which is connected by means of an endless twisted driving chain 14 to the band wheel 10 on the wheel shaft. It will thus be seen that the shaft 11 is rotated in a direction opposite to the movement of the machine. Power is transmitted from this shaft for the operation of the seed dropping mechanism in a manner which will be hereinafter more fully set forth. The hopper is provided with a transversely inclined bottom 6', one of the longitudinal edges of which is spaced from the side wall of the hopper. The longitudinal side bars of a chute 15 are secured at their upper edges to the bottom and side of the hopper respectively. A longitudinal bar 16 is arranged between the side bars of the chute and extends the entire length of the hopper. This bar is disposed slightly below the plane of the inclined bottom 6' and is provided with a plurality of openings 16'. Inwardly and downwardly inclined directing plates 17 are secured to the end walls of the hopper and to the bar 16, the inner ends of said plates being disposed adjacent to the end openings 16'. Between the end openings and the central opening of the bar 16 the inverted V-shaped directing members 17' are arranged, and secured in any suitable manner at their edges to the bar 16. It will thus be seen that as the seed potato gravitates toward the lower side of the hopper bottom, and between the directing members 17 and 17', it will be directed into the openings 16' of the bar 16 through which it is adapted to be deposited, such deposit being intermittently effected in the manner which will now be described in detail.

A valve plate 18 is arranged between the side walls of the chute beneath the bar 16 and normally closes the openings therein. This plate is also provided with openings 18' similar in number to the openings in the bar 16 with which they are adapted to coöperate. The plate 18 is supported for longitudinal movement beneath the bar 16 by means of the headed pins 19, which depend from the bar 16 and are disposed through short longitudinal slots 18ᵃ in the valve plate 18. This valve plate is intermittently and longitudinally moved to aline its openings 18' with the openings 16' of the bar 16. The mechanism for actuating the valve plate is more clearly illustrated in Fig. 3 of the drawings, and comprises an endless chain 20 which traverses the sprocket pinions 21 mounted upon short transverse shafts 22 journaled in the hanger bars 23 depending from opposite ends of the chute 15.

Upon one end of the intermediate transverse shaft 22, a sprocket 24 is secured. A similar sprocket 25 is fixed upon the end of the transverse shaft 11, and a chain 26 traverses these sprockets and transmits power to the shaft 22 to drive the chain 20. The upper stretch of the chain 20 is disposed between the sides of the chute 15 and moves upon the bottom thereof.

The sliding valve plate 18 is intermittently moved by means of the dogs 27 which are arranged at intervals upon the chain 20. These dogs are normally held in a vertical position by means of the leaf springs 27' which yieldingly support the same. The plate 18 is formed at its rear end with a downturned flange 28 with which the dogs 27 are adapted to successively engage. The springs 27' have sufficient tensional force to maintain the dogs 27 in their vertical position until they have engaged and moved the plate 18 the extent of the slots 18ª therein, or until the forward ends of these slots engage the depending pins 19. These pins limit the sliding movement of the plate in the continued movement of the chain 20, the dogs 27 which are pivotally mounted thereon, moving under the depending flange 28 against the tension of the springs 27. A spring 29 has one of its ends secured to the forward end of the feed hopper and its other end to the sliding plate 18. This spring yieldingly holds the sliding valve plate against movement, and the openings 18' thereof out of register with the openings 16' of the bar 16.

The rear end of the chute 15 extends over the rear sprocket 21 and provides a protection for the same. To this rear end of the chute a spout 30 is secured, and extends downwardly and rearwardly therefrom. From this spout the seed potatoes are deposited in the furrow which has previously been made by a plow.

From the foregoing it is believed that the construction and operation of my improved potato planting machine will be readily understood. While I have described the same as best adapted for the planting of seed potato, it will be obvious that the machine may also be employed for planting corn or other seed.

By providing the spaced yieldingly held dogs 27 on the chain 20, the valve plate is intermittently moved to deposit the potato in the chute 15, and after the dog passes beneath the flange end of said plate, the spring 29 immediately returns the plate to its normal position, and closes the opening 16' thus preventing the further deposit of the potato into the chute. The dogs 27 may be so spaced upon the chain that the period of time which elapses between each deposit of the seed may be regulated as desired. In this manner the seed may be easily and quickly planted, the machine requiring no attention whatever on the part of the driver. Its construction is comparatively simple and it may also be manufactured at a minimum cost. Further it is extremely efficient in practical operation, and durable in construction.

While I have shown and described the preferred construction and arrangement of the various elements, it will be understood that the machine is susceptible of a great many modifications without departing from the essential feature or sacrificing any of the advantages embodied therein.

I claim:—

1. The combination with a wheel supported frame, and a hopper mounted thereon, said hopper having a plurality of openings in its bottom of a sliding valve plate arranged beneath said openings, a chute extending beneath the valve plate, said plate having a plurality of openings therein to register with the openings in the bottom of the hopper, means movable through the chute to engage with said plate and move the same to aline the openings therein with the openings in the bottom of the hopper, and means for returning said plate to its normal position.

2. The combination with a wheel supported frame, and a hopper mounted thereon having a plurality of openings in its bottom, of directing means arranged in the hopper to direct material into the openings, an inclined chute supported beneath the hopper, and having its sides extending through the bottom thereof, a sliding valve plate mounted upon the bottom of the hopper beneath the openings therein, an endless chain having its upper stretch movable through the chute, means carried by the chain engaging the valve plate to intermittently slide the same and aline the openings therein with the openings in the bottom of the hopper, power transmitting means between one of the supporting wheels and said chain, and means for returning the valve plate to its normal position.

3. The combination with a wheel supported frame, of a hopper mounted thereon, having a transversely inclined bottom, one of the longitudinal edges of said bottom being spaced from the side of the hopper of a chute extending between the side and bottom walls of the hopper, and inclined downwardly and rearwardly beneath the same, a longitudinal bar mounted between the side walls of the chute beneath the bottom of the hopper and having a plurality of openings therein, a plurality of directing elements arranged in the hopper to direct the seed into said openings, a longitudinally movable valve plate mounted on said bar having openings therein for alinement with the openings in the bar, means yieldingly holding said plate against movement to close the openings in said bar, means for limiting the sliding movement of the plate, an endless chain having its upper stretch movable between the sides of the chute, a plurality of spaced yieldingly held dogs carried by the chain to engage said plate and move the same, and power transmitting means between one of the supporting wheels and said chain.

4. The combination with a wheel supported frame, and a hopper mounted thereon having openings in its bottom, of a plurality of inclined directing plates arranged in the hopper to direct seed into said openings, a longitudinally slidable valve plate arranged beneath the hopper having openings therein to register with the openings in the bottom of the hopper, pins depending from the hopper, said plate having a plurality of longitudinal slots to receive the pins, said pins limiting the longitudinal movement of the plate, a chute arranged beneath the hopper and extending downwardly and rearwardly therefrom, a spring secured to the valve plate and to the hopper adapted to normally hold said plate against movement and to close the openings in the bottom of the hopper, means movable through the chute engaging with one end of the valve plate to move said plate and aline its openings with the openings of the hopper, and power transmitting means between one of the supporting wheels and said last mentioned means.

5. The combination with a wheel supported frame having a hopper mounted thereon provided with a plurality of openings in its bottom of a longitudinally movable valve plate mounted on the bottom of the hopper beneath said openings, said plate having openings therein to aline with the openings in the hopper, means for limiting the sliding movement of the plate, means yieldingly holding the plate in its normal position to close the openings in the hopper, a chute arranged beneath the hopper and extending downwardly and rearwardly therefrom, hanger bars depending from the chute, sprockets mounted between said hanger bars, an endless chain traversing said sprockets, spaced dogs movably mounted on the chain, leaf springs engaging said dogs to yieldingly hold the same against movement, the upper stretch of said chain being movable between the sides of the chute, said valve plate having a flange formed on one end to be engaged successively by the dogs carried by the chain, and power transmitting means between one of the supporting wheels and the chain for moving the latter.

In testimony whereof I hereunto affix my signature in the presence of two witnesses.

JAMES MATHEW LEBAR.

Witnesses:
A. I. VESSEY,
CHAS. WATTS.

---

Copies of this patent may be obtained for five cents each, by addressing the "Commissioner of Patents, Washington, D. C."